United States Patent

Matsuno et al.

[11] Patent Number: 5,254,907
[45] Date of Patent: Oct. 19, 1993

[54] LIGHTING SYSTEM FOR USE IN VEHICLE CABIN

[75] Inventors: Yoshio Matsuno, Tokyo; Hitoshi Matsui, Kawasaki; Izumi Okamura, Hikone; Teruaki Shigeta; Yoshinori Tanabe, both of Osaka, all of Japan

[73] Assignees: Nissan Motor Co., Ltd., Yokohama; Matsushita Electric Industrial Co., Ltd., Osaka, both of Japan

[21] Appl. No.: 761,052

[22] Filed: Sep. 18, 1991

[30] Foreign Application Priority Data

Sep. 21, 1990 [JP] Japan .............................. 2-253446
Sep. 21, 1990 [JP] Japan .............................. 2-253447

[51] Int. Cl.$^5$ .............................................. B60Q 1/00
[52] U.S. Cl. ........................................ 315/77; 315/84; 315/158; 307/10.8
[58] Field of Search ................ 315/77, 84, 157, 158, 315/159, 291; 307/10.1, 10.8; 362/75, 83.3, 276, 80

[56] References Cited

U.S. PATENT DOCUMENTS

| | | |
|---|---|---|
| 2,337,794 | 12/1943 | Arenberg . |
| 2,582,738 | 1/1952 | Arenberg . |
| 2,635,681 | 4/1953 | Hiltman et al. . |
| 3,604,979 | 9/1971 | Shimizu ............... 315/317 |
| 4,139,801 | 2/1979 | Linares ................ 315/159 |
| 4,217,628 | 8/1980 | Windom . |
| 4,670,819 | 6/1987 | Boerema et al. . |
| 5,047,688 | 9/1991 | Alten ..................... 315/84 |

FOREIGN PATENT DOCUMENTS

| | | |
|---|---|---|
| 54-3759 | 6/1977 | Japan . |
| 59-145638 | 1/1983 | Japan . |
| 0193945 | 8/1986 | Japan ................. 315/77 |

OTHER PUBLICATIONS

"Report of Fundamental Reserach on How Guide Lamp is Seen", Lighting Society of Japan, 1984.
"Adjustment of Luminance in Living Room", Meeting of Union of Kansai Branches of Electric and Related Societies, by Sotaro Matsuda, 1966.
07/892,302, Jun. 1992, Asada et al.
07/761,057, Sep. 1991, Matsuno et al.
07/761,054, Sep. 1991, Matsuno et al.
07/761,056, Sep. 1991, Matsuno et al.

Primary Examiner—Eugene R. LaRoche
Assistant Examiner—Son Dinh
Attorney, Agent, or Firm—Lowe, Price, LeBlanc & Becker

[57] ABSTRACT

A lighting system for use in a vehicle cabin comprises a first lamp arranged to a roof, a second lamp arranged to a seat, and a third lamp arranged to a door. A demand is generated for providing a predetermined information to a passenger when getting out, and the first, second and third lamps are turned on in response to this demand.

2 Claims, 5 Drawing Sheets

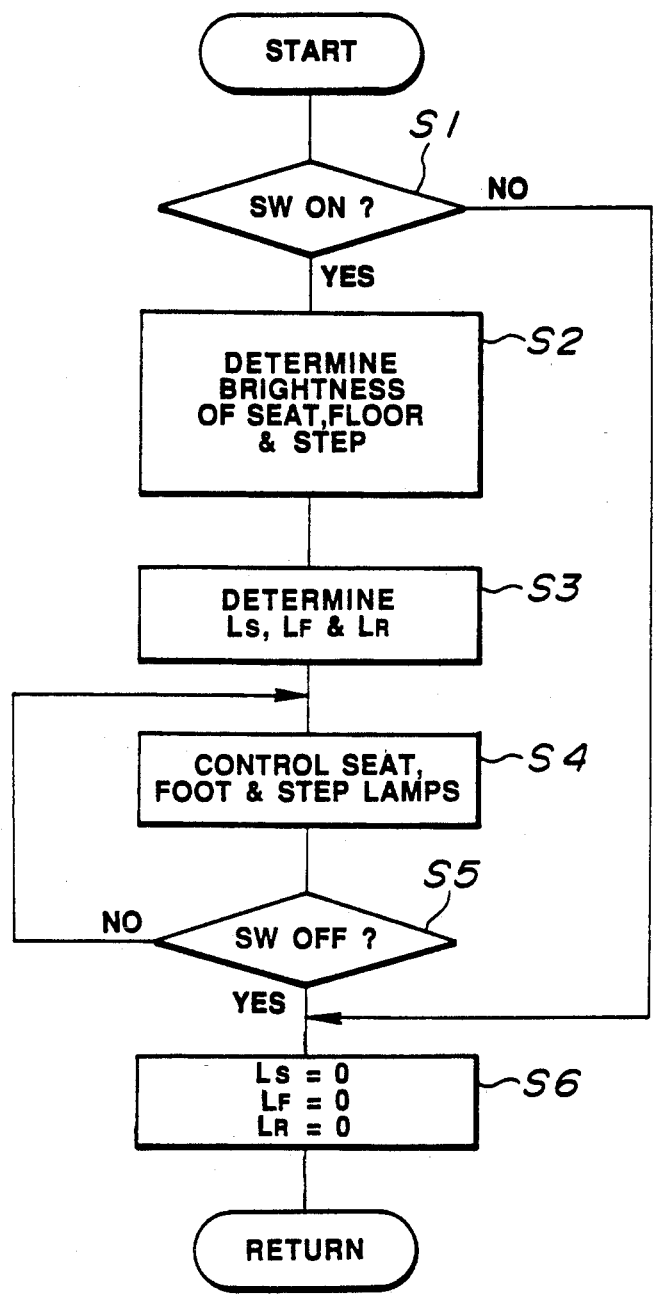

LIGHTING SYSTEM FOR USE IN VEHICLE CABIN

BACKGROUND OF THE INVENTION

The present invention relates to a lighting system for use in a vehicle cabin.

A previously known lighting system for use in a vehicle cabin includes a ceiling lamp arranged to a roof substantially in the center portion of the vehicle cabin for generally illuminating a cabin. The ceiling lamp turns on and off by manual operation of its own switch, or automatic operation of a door switch upon opening and closing of a door.

On the other hand, with a vehicle, it is important that a passenger who will get out the vehicle in the dark or at night can quickly view the road outside the door to ensure his security, and smoothly get out the vehicle.

It is known that human eyes are easy to fix to a spot which is sufficiently lighter than its surroundings. This is the ocular guide effect (see, for example, "Report of Fundamental Research on How Guide Lamp is Seen" published in 1984 by Lighting Society in Japan). This effect is commonly applied to interior and exterior lightings.

However, with a vehicle having such previously known lighting systems, a passenger seated in the rear seats cannot judge whether the vehicle has stopped due to arrival at a destination, due to a traffic signal, resulting in confusion and unnecessary activity. Further, when it is time for the passengers to exit the vehicle, preparations must be made under visual conditions having insufficient light, lowering preparation efficiency for exiting with the possibility of an object left in the vehicle or a window unclosed. Furthermore, with the oral information for his preparations before arrival at a destination, the passenger can make preparations in advance. In this case, however, it is not desirable to turn on a ceiling lamp due to its interference to driving, resulting in eventual difficulty of making exit preparations. Further, even with the ceiling lamp turned on, the passenger has difficulty in checking the vicinity of his feet due to insufficient illumination.

On the other hand, with any door opened, a lamp such as a ceiling lamp turns on to uniformly illuminate the entirety of the cabin. However, the lamp is not constructed to safely guide a passenger for efficient exit of the vehicle.

It is, therefore, an object of the present invention to provide a lighting system for use in a vehicle cabin which can provide predetermined information to a passenger when getting out of the vehicle.

SUMMARY OF THE INVENTION

According to one aspect of the present invention, there is provided, in a method of controlling a lighting system for use in a cabin of a vehicle on a road, the vehicle having a seat, a roof, a floor, a door and a seat occupant, the lighting system including a first lamp arranged to the roof, a second lamp arranged to the seat and a third lamp arranged to the door:

generating a demand for providing a predetermined information to the seat occupant; and turning on the first lamp, the second lamp and the third lamp in response to said demand.

According to another aspect of the present invention, there is provided a lighting system for use in a cabin of a vehicle on a road, the vehicle having a seat, a roof, a floor, a door and a seat occupant, the lighting system comprising:

a first lamp arranged to the roof;

a second lamp arranged to the seat;

a third lamp arranged to the door;

means for generating a demand for providing a predetermined information to the seat occupant; and means for turning on said first lamp, said second lamp and said third lamp in response to said demand.

BRIEF DESCRIPTION OF THE DRAWINGS

FIG. 6 is a flowchart showing the operation of the second preferred embodiment.

DETAILED DESCRIPTION OF THE INVENTION

Figure 1:
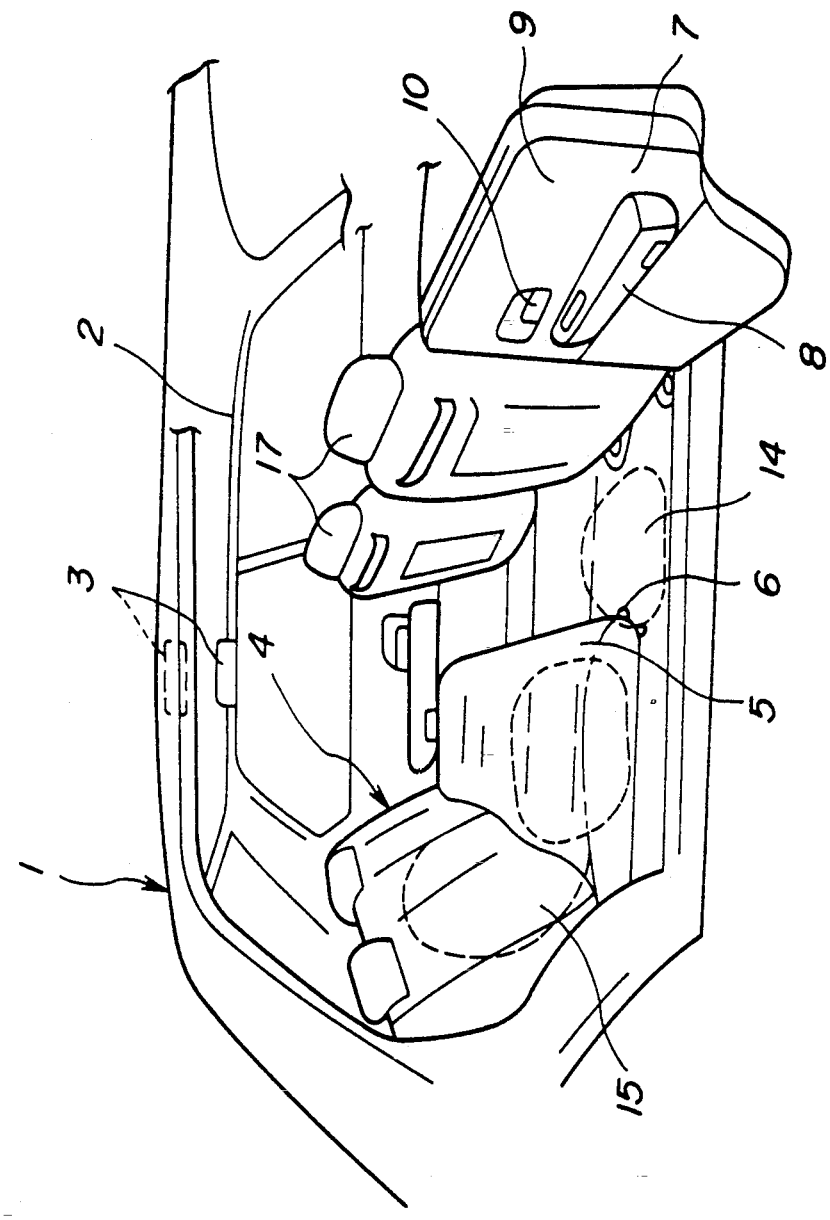
FIG. 1 is a perspective view illustrating an automotive vehicle to which a first preferred embodiment of the invention is applied.
Figure 2:
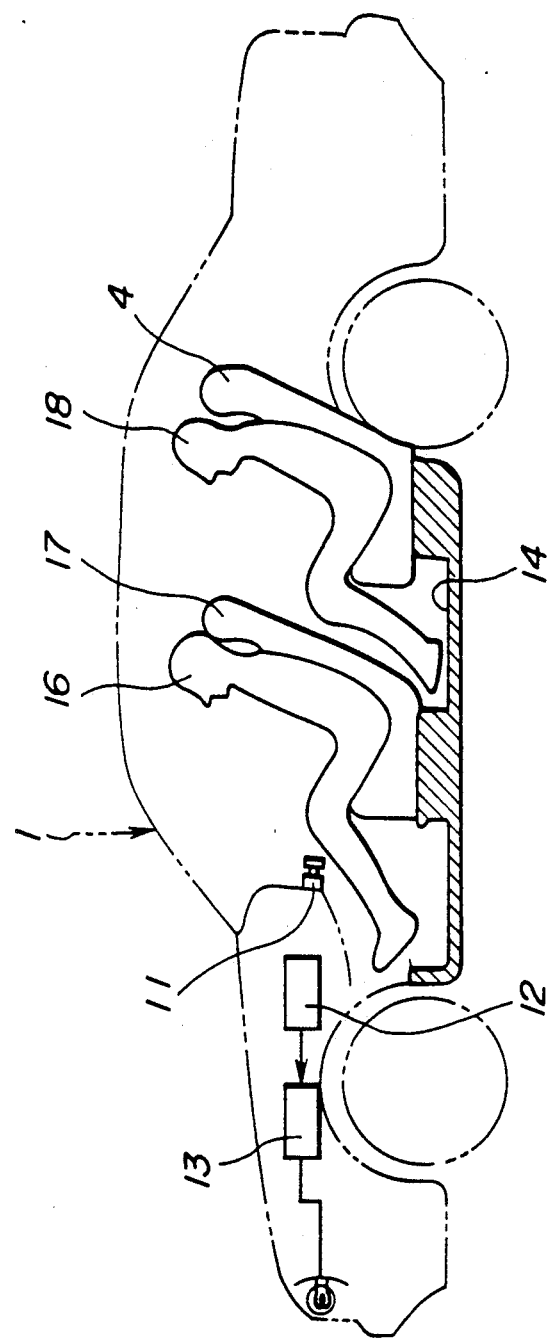
FIG. 2 is a side view illustrating the automotive vehicle in FIG. 1.

Referring to FIGS. 1 and 2, a first preferred embodiment of a lighting system for use in a vehicle cabin is described.

The lighting system includes a seat lamp 3 supported to a side roof rail 2 of a vehicle body 1, a foot lamp 6 arranged in the front part of a seat cushion 5 of a rear seat 4, and an arm rest lamp 10 arranged to a door trim 9 or a cabin wall on the upside of the arm rest 8 of a rear door 7. The lighting system further includes a getting-out signal transmitter 11 capable of transmitting an on-off signal to the lamps 3, 6, 10, a power supply 12 for supplying the getting-out signal transmitter 11 and the lamps 3, 6, 10 with electricity, and a lighting circuit 13. It is to be noted that a reference numeral 14 designates a floor of the vehicle body 1, and 15 designates a seat surface of the seat cushion 5.

When a driver 16 turns on the getting-out signal transmitter 11 to inform a passenger 18 of his getting-out, the transmitter 11 provides to the lighting circuit 13 a first signal for turning on the sent lamp 3. The first signal is generated by, for example, disengagement of a door lock, change in vehicle power, or manual operation. As a result, the lighting circuit 13 is in operation to light the seat lamp 3. Thus, at least the seat surface 15 of the rear seat 4 can be illuminated to inform in advance the passenger 18 of his exit, resulting in easy and quick preparations under good visual conditions before arrival at a destination. Upon or after turning-on of the seat lamp 3, the getting-out signal transmitter 11 automatically provides to the lighting circuit 13 a second signal for turning on the foot lamp 6 and the arm rest lamp 10, thus lighting same.

Figure 3:
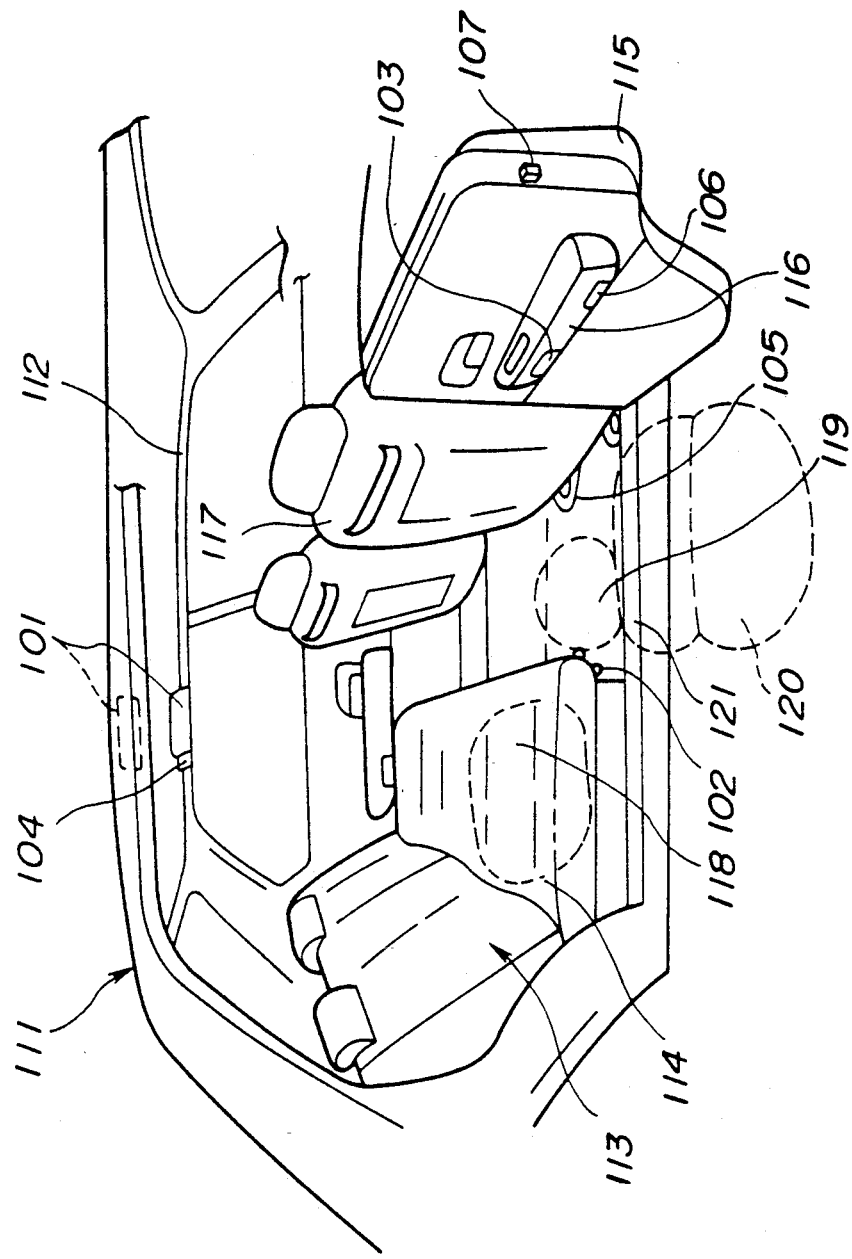
FIG. 3 is a view similar to FIG. 1, showing a second preferred embodiment of the present invention.
Figure 4:
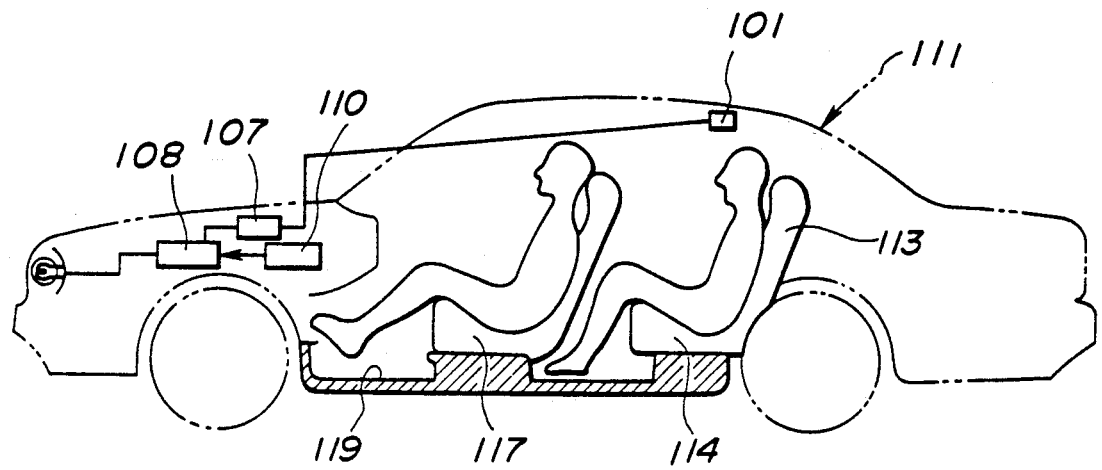
FIG. 4 is a view similar to FIG. 2, illustrating an automotive vehicle in FIG. 3.
Figure 5:
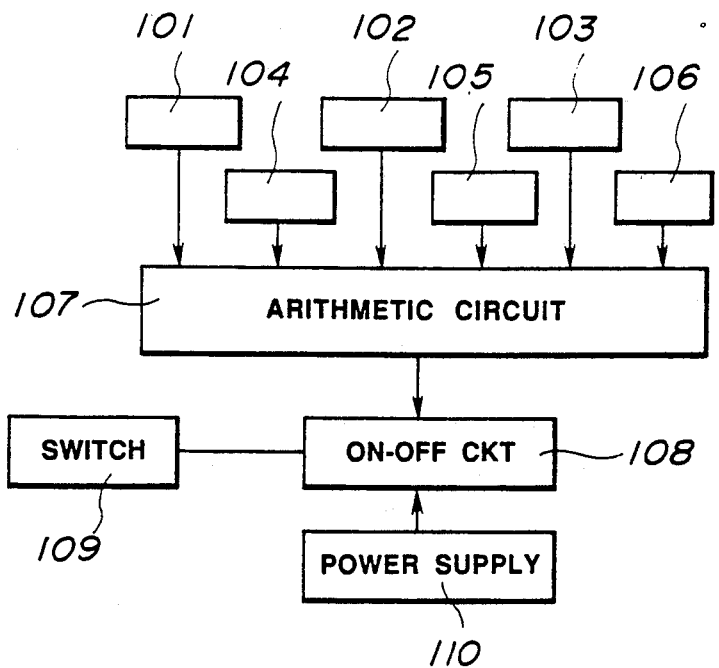
FIG. 5 is a block diagram of the lighting system in FIG. 3.

Referring to FIGS. 3 to 5, a second preferred embodiment of a lighting system for use in a vehicle cabin is described.

The lighting system includes a seat lamp 101 supported to a side roof rail 112, a foot lamp 102 arranged in the front part of a seat cushion 114 of a rear seat 113, and a step lamp 103 arranged to an arm rest 116 of a rear door 115. The lighting system also includes a first sensor 104 arranged in the vicinity of the seat lamp 101 for detecting the brightness of a seat surface 118 of the seat cushion 114 of the rear seat 113, a second sensor 105 arranged in the rear part of a front seat 117 for detecting the brightness of a floor 119, and a third sensor 106 arranged in the vicinity of the step lamp 103 for detecting the brightness of a road 120 and a step 121 when the rear door 115 is opened.

The lighting system further includes an arithmetic circuit 107 for controlling the seat lamp 101, the foot lamp 102, and the step lamp 103 to obtain a gradual increase in brightness in order of the seat surface 118 of the seat cushion 114, the floor 119, and the road 120/the step 121, an on-off circuit 108 for turning on the lamps 101, 102, 103 when the rear door 115 is opened, and turning off same when the door 115 is closed through a switch 109 which operates with opening and closing thereof, and a power supply 110 for supply the on-off circuit 108 with electric power. The arithmetic circuit 107 may control the seat lamp 101 to gradually decrease the brightness of the seat surface 118 of the seat cushion 114 after turning-on of the lamps 101, 102, 103.

Referring to FIG. 6, the operation of the second preferred embodiment is described.

When the rear door 115 is opened, the switch 109 is turned on therewith (step S1). A signal transmitter (not shown) of the known type disposed to the rear door 115 provides a door opening indicative signal to the seat lamp 101, the foot lamp 102, and the step lamp 103. Thus, the seat lamp 101 illuminates the seat surface 118 of the seat cushion 114 of the rear seat 113 in the vicinity of the rear door 115. The foot lamp 102 illuminates the floor 119 in the vicinity of the rear door 115. The step lamp 103 illuminates the road 120 and the step 121 in the vicinity of the rear door 115. The brightness of the seat surface 118 of the seat cushion 114, the floor 119, and the road 120/the step 121 are detected by the first, second, and third sensors 104, 105, and 106 (step S2). The luminances $L_S$, $L_F$, $L_E$ of the lamps 101, 102, 103 are determined in response to the detected brightness to obtain a gradual increase in brightness in order of the seat surface 118 of the seat cushion 114, the floor 119, and the road 120/the step 121 (step S3). The lamps 101, 102, 103 are then controlled to have the determined luminances $L_E$, $L_F$ and $L_R$ (step S4). When the switch 109 is turned off (step S5), the luminances $L_S$, $L_F$ and $L_R$ are set to zero, that is, the lamps 101, 102, and 103 are turned off (step S6).

With the gradual increase in brightness in order of the seat surface 118 of the seat cushion 114, the floor 119, and the road 120/the step 121, an ocular guide effect to the road 120 and the step 121 as visual objects can be improved. Further, the rear door 115 and a front door (not shown) have the step lamp 103, respectively, which is turned on only when the corresponding door is opened, resulting in the improvement in economy.

The luminance of an illuminant of the step lamp 103 is set to be less than 22,000 cd/m$^2$. This is a critical value of luminance which does not result in a glare to a passenger when looking at the lights.

What is claimed is:

1. A method of controlling a lighting system for use in a cabin of a vehicle on a road, the vehicle having a seat, a roof, a floor, a door and a seat occupant, the lighting system including a first lamp arranged to the roof, a second lamp arranged to the seat and a third lamp arranged to the door, the method comprising the steps of:

generating a demand for providing a predetermined information to the seat occupant, controlling by means of a plurality of sensors and an arithmetic circuit, luminance of the first, second and third lamps to obtain a gradual increase in brightness in order of the seat, the floor and the road; and sequentially turning on the first lamp, the second lamp and the third lamp in response to said demand.

2. A method of controlling a lighting system for use in a cabin of a vehicle on a road, the vehicle having a seat, a roof, a floor, a door and a seat occupant, the lighting system including a first lamp arranged to the roof, a second lamp arranged to the seat, and a third lamp arranged to the door, the method comprising the steps of:

generating a demand for providing a predetermined information to the seat occupant; and turning on the first lamp, the second lamp and the third lamp in response to said demand in such a manner as to obtain a gradual increase in brightness in order of the seat, the floor and the road.

* * * * *